(12) United States Patent
Huerta

(10) Patent No.: US 7,971,065 B2
(45) Date of Patent: Jun. 28, 2011

(54) METHOD AND APPARATUS FOR PATH CONCEALMENT IN NETWORKS AND GRAPHS

(75) Inventor: Juan M. Huerta, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/128,701

(22) Filed: May 29, 2008

(65) Prior Publication Data

US 2008/0222424 A1    Sep. 11, 2008

Related U.S. Application Data

(63) Continuation of application No. 11/461,784, filed on Aug. 2, 2006, now abandoned.

(51) Int. Cl.
*G06F 21/00* (2006.01)
(52) U.S. Cl. ............ 713/182; 713/183; 713/184; 726/2; 726/26
(58) Field of Classification Search .......... 713/182–184; 707/1; 726/2, 26
See application file for complete search history.

(56) References Cited

U.S. PATENT DOCUMENTS

| 7,302,383 | B2 | 11/2007 | Valles |
| 2003/0018608 | A1 | 1/2003 | Rice et al. |
| 2003/0204834 | A1 | 10/2003 | Ball et al. |

OTHER PUBLICATIONS

Author Richard A. Frost, "Call For A Public-Domain SpeechWeb", Communications Of the ACM, Nov. 2005, vol. 48, No. 11, ISSN: 0001-0782, pp. 45-49.

*Primary Examiner* — Thanhnga B Truong
(74) *Attorney, Agent, or Firm* — Cantor Colburn LLP; Ann Dougherty

(57) ABSTRACT

A method for data concealment between two parties in a system, including: permitting the system to solicit one or more data from a user; permitting the system to generate a traversed path in a graph by using the one or more data provided by the user to generate the traversed path; performing a sequence of computations; associating square matrices to each connected node of the plurality of nodes of the traversed path in the graph; initiating each of the sequence of computations with a random vector; performing matrix multiplications at each step in the sequence of computations; obtaining a result vector; using the result vector of a matrix and a vector product of each connected node of the plurality of nodes of the traversed path as a vector in a subsequent node in the traversed path; comparing an outcome of the sequence of computations to a value associated with the traversed path of a correct password.

15 Claims, 10 Drawing Sheets

METHOD AND APPARATUS FOR PATH CONCEALMENT IN NETWORKS AND GRAPHS

CROSS REFERENCE TO RELATED APPLICATIONS

This application is a continuation of U.S. patent application Ser. No. 11/461,784 filed Aug. 2, 2006, the contents of which are incorporated by reference herein in their entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to an apparatus and method for path concealment, and particularly to a path concealment apparatus and method where a verification grammar and a key are dynamically generated each time a keyphrase verification task is performed, and in which the semantic annotation takes place in the form of matrix vector operations.

2. Description of Background

User verification is an often-performed task in speech applications. When the speech application takes place in a distributed or network environment (e.g., in a telephony environment) the application designer takes into consideration the possibility that the confidentiality of the data in the network or in the application servers is vulnerable to network eavesdroppers, intruders, or even malicious application analysts. If the network traffic is not secure or encrypted, the intruder is able to observe the sequence of request and response cycles between the application components and analyze markup, submitted values, and application artifacts. In addition, even if the communication is encrypted, a typical speech application leaves behind a substantial set of resources and artifacts (cached grammars, lexica, log files, etc.) that can be collected and reverse engineered to extract or infer the authentication information.

Due to industry trends like business process outsourcing and application hosting, and to the emergence of sophisticated analysis tools, more and more information is made available by the application for system analysts and tools to perform their jobs. The information that makes the application more analyzable but it also makes it more prone to be reverse engineered.

A common way to perform user verification, without using biometrics, is to verify a password or a multi-word utterance (the keyphrase, denoted by $u_k$) for a specific user $user_k$ under the assumption that only this user knows it. Examples of what can constitute a good keyphrase are: date of birth, social security number, amount of last account transaction, etc. This process is called text-dependent user verification. A basic keyphrase verification algorithm can be formulated as follows: let $\hat{u}_k$ be the recognition hypothesis to the challenge question specific to $user_k$, and $\hat{a}_k$ be its semantic annotation using the annotation grammar A (i.e., $\hat{a}_k = A(\hat{u}_k)$). This process may be performed concurrently by the decoding verification grammar G, which is the combination of a decoding network D and the semantic annotation network A. Keyphrase validation is performed in terms of a distance computation between $\hat{a}_k$ and $a_k$.

In an unprotected system, an intruder can obtain for a specific session $\hat{a}_k$ and A, and based on session information can associate this information with $user_k$, and can compute $A^{-1}$ and infer $\hat{u}_k = A^{-1}(\hat{a}_k)$. For example, the annotation "A-03-75" might be traceable to "august third 1975" if A is available and easily invertible. In an unprotected system, an intruder might be able to associate this date as the birthday of user John Doe.

The above scenario provides a motivation for information concealment so that an intruder cannot easily compromise the verification process for a $user_k$ by observing any of the application information or network traffic.

Considering the limitations of the aforementioned methods, it is clear that there is a need for a method for concealing keyphrase verification. In the proposed method a verification grammar and a key are dynamically generated each time a keyphrase verification task is performed, and in which the semantic annotation takes place in the form of matrix vector operations. If the keyphrase is correct, the annotation will converge to the key. In this way, the client can generate annotations robust to reverse engineering. An intruder capable of observing network traffic, voice browser markup, annotation grammars, annotation scripts, and the resulting annotation hypothesis will not be able to infer the keyphrase.

SUMMARY OF THE INVENTION

The shortcomings of the prior art are overcome and additional advantages are provided through the provision of a method for data concealment between two parties in a system, the method comprising: permitting the system to solicit one or more data from a user; permitting the system to generate a traversed path in a graph by using the one or more data provided by the user to generate the traversed path; performing a sequence of computations, each step in the sequence of computations being dictated by each connected node of a plurality of nodes of the traversed path in the graph; associating square matrices to each connected node of the plurality of nodes of the traversed path in the graph; initiating each of the sequence of computations with a random vector; performing matrix multiplications at each step in the sequence of computations; obtaining a result vector; using the result vector of a matrix and a vector product of each connected node of the plurality of nodes of the traversed path as a vector in a subsequent node in the traversed path; comparing an outcome of the sequence of computations to a value associated with the traversed path of a correct password by using cosine distances between vectors; and determining whether the user has determined the correct password based on the value associated with the traversed path of the correct password being less than a predetermined threshold value.

Additional features and advantages are realized through the techniques of the present invention. Other embodiments and aspects of the invention are described in detail herein and are considered a part of the claimed invention. For a better understanding of the invention with advantages and features, refer to the description.

TECHNICAL EFFECTS

As a result of the summarized invention, technically we have achieved a solution that provides for a method for concealing keyphrase verification.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
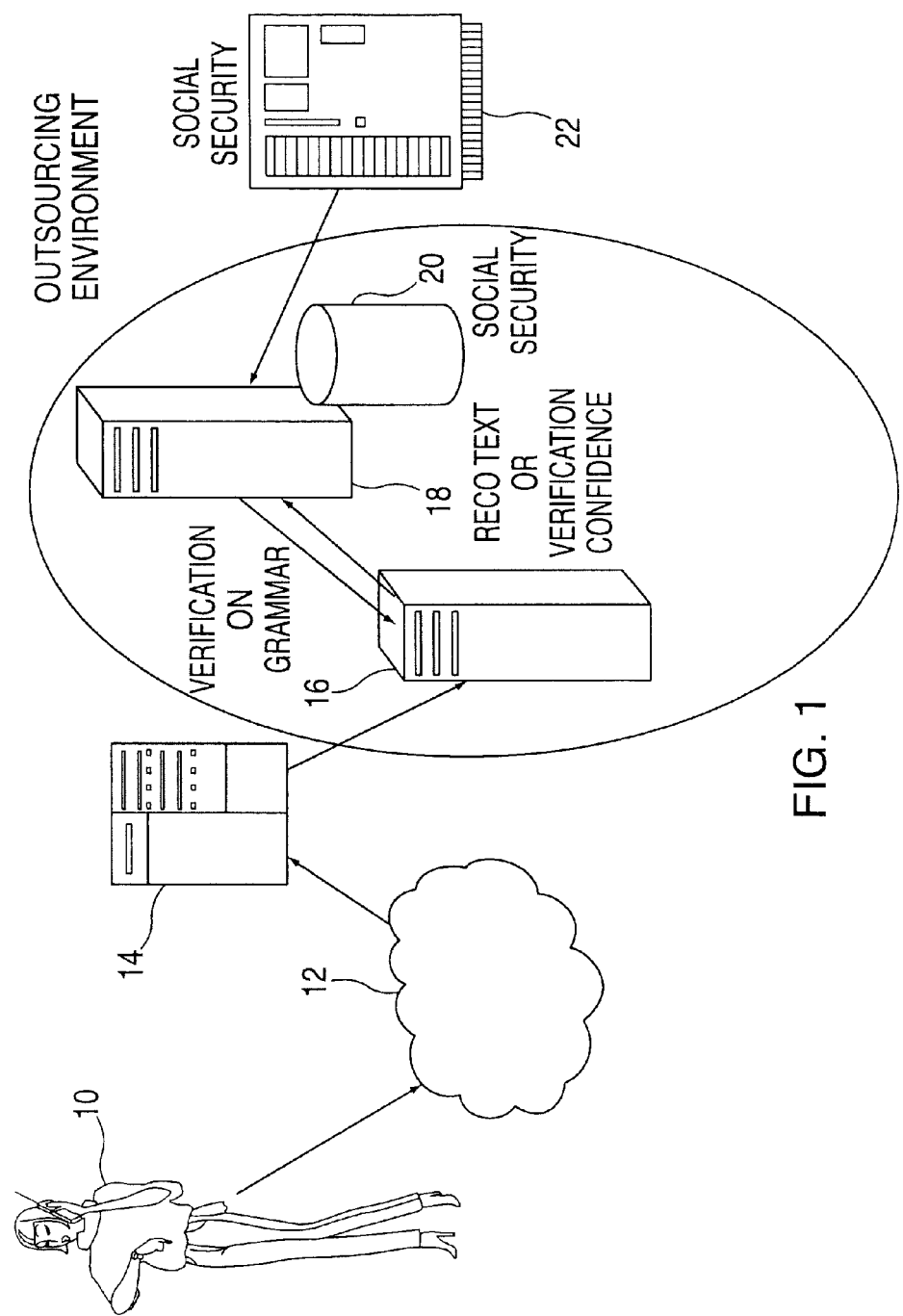
FIG. 1 illustrates one example of an insecure system having speech application log files and databases.

One aspect of the exemplary embodiments is a user verification process in speech applications. Another aspect of the exemplary embodiments is a method where a verification grammar and a key are dynamically generated each time a keyphrase verification task is performed, and in which the semantic annotation takes place in the form of matrix vector operations.

Specifically, in order to prevent an intruder from verifying the keyphrase of $user_k$, it is desirable that a system has the following features:

The correct keyphrase $u_k$ or the path traversed by the correct hypothesis in the decoding graph G cannot be inferred statically by looking at the resulting annotation $\hat{a}_k$ or by statically analyzing the graph (A, G, or D).

The correct keyphrase $u_k$ cannot be reverse-engineered or obtained from decoding artifacts, including graphs, grammars, logs, annotations, session information, network traffic etc.

The probability of finding the $u_k$ by trial and error (even after observing the user authenticate in multiple instances) is low.

The annotation function A provides an annotation $\hat{a}_k$ is a smooth function of $u_k$, i.e., small deviations from the correct utterance result in small distances between hypothesized and true annotations, and so forth.

Having observed several times the keyphrases annotation for $user_k$ in various instances would not be of help to produce a correct annotation for userk in session n.

As far as the structure run-time environment is concerned, to facilitate the above features, the conversational applications are structured in a way that decouples the security handling subsystem from the interaction subsystem. Thus the application has two parts: a secure and an unsecure part. It is assumed that the security handling subsystem (the secure part of the application) is responsible for the generation of the key and verification grammar $G_k$ from the cleartext keyphrase for each user k and that the interaction part of the application (the unsecure part) is responsible for handling the user's response, obtaining its annotation and submitting this annotation to the secure part of the system, where the comparison between key and annotation is performed.

The secure part can be a commercial identity management solution, while the unsecure part corresponds to the voice browser, the recognition engine, and application components that handle interaction (server pages etc.). The security subsystem can make G not only user dependent, but also session dependent, thus $G_{k,n}$ will be particular to every user k and every session n. The key and the annotation are also session dependent.

Moreover, the unsecure part of the application takes $G_{k,n}$ and performs recognition of the utterance of the grammar, and obtains and annotation $\hat{a}_k$ which is compared against the key $a_{k,n}$ in the secure part of the application. The keyphrase annotation $a_{k,n}$ (the key) is the annotation of utterance $u_k$ when grammar $G_{k,n}$ is used, and because we assume $G_{k,n} \neq G_{k,m}$ when n≠m, (i.e., the grammar changes in every session for every user), knowing the annotation $a_{k,n}$ for user k during session n is of no use in session m. The question is how to generate $G_n$ so that $\hat{a}_k$ has a smooth error function, and $G_n$ is robust to reverse engineering.

Next, in accordance with the exemplary embodiments, an approach to substituting simple semantic annotations in a verification network G for node vector operations on a given vector is described. For instance, let path $P_k=\{p1, p2, \ldots pL\}$ with $0 \leq j \leq L$, denote the path of nodes traversed in annotation network A by the observed utterance $\hat{u}_k$. Furthermore, let network A be of size Z (i.e., have Z nodes) and with each node Ni belong to A and associate a vector Yi belong to $R^{d \times d}$. Moreover, let seed vector $x_o$ be a random vector of dimension d. The annotation performed by A corresponding to an observed utterance $\hat{u}_k$ will be $\hat{a}_k$. Further, it is assumed that $\hat{u}_k$ results in traversed path $P_k$ when A is used, then $\hat{a}_k$ is computed in the following way:

$x_k+1=Y_k x_k$ with $node_k$ belonging to P and $0 \leq k \leq L$; and $\hat{a}_k = x_L$;

Thus, A is an annotation grammar which instead of having words or symbols in the nodes, performs a matrix multiplication on a input vector $x_o$ and returns as annotation the vector $\hat{a}_k$. Verification is thus performed by computing the distance between the annotation and key vectors: d=cosine_distance (key, $\hat{a}_k$)

When an application wants to verify that the current user knows the keyphrase utterance for $user_k$ the following steps ensue:

The secure subsystem retrieves the keyphrase and assembles a general verification network A.

The secure subsystem generates symmetric random vector K with target eigenvalue distribution and obtains its dominant eigenvector, the key.

The secure subsystem associates matrices in each node in A: occluded K for nodes in the path corresponding to the correct keyphrase and random matrices otherwise.

The secure subsystem publishes A and the challenge question to the unsecure subsystem, which in turn makes these information available to the interaction component.

The user provides an utterance to the challenge question, which determines an annotation path A. The annotation algorithm generates a random seed and traversing the path performs the matrix operations of the path in the random seed.

The resulting vector is sent to the secure subsystem, which computes the cosine distance between key and received vector. It determines with a certain confidence whether or not the user uttered the keyphrase. An intruder would need to find the inverse of A given the resulting vector, or statically perform the factorization described in section 3.5, both computationally impractical.

Referring to FIG. 1, one example of an insecure system having speech application log files and databases is presented. The insecure system comprises a user 10, a network 12, a host system 14, a verification on grammar database 16, a verification confidence database 18, a social security database 20, and a mainframe 22. The user 10 makes a request to the mainframe 22 via the network 12. The mainframe 22 verifies that the user 10 is an authorized user by using the keyphrase provided by the user and the verification grammar to ensure that the keyphrase is accepted by the grammar.

Figure 2:
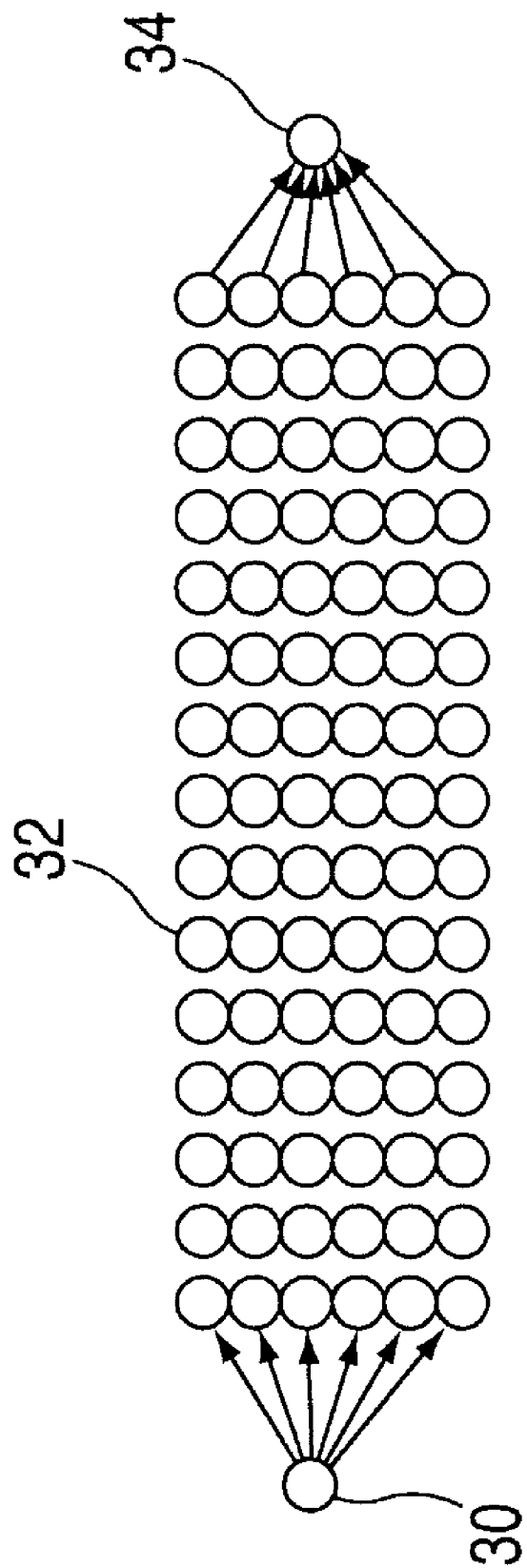
FIG. 2 illustrates one example of a graph including a plurality of nodes.

Referring to FIG. 2, one example of a graph including a plurality of nodes is presented. The graph comprises an initial node 30, a plurality of nodes 32, and a terminal node 34. A traversed path will connect initial node 30 and the final node 32 through a connected path in the plurality of nodes 32.

Figure 3:
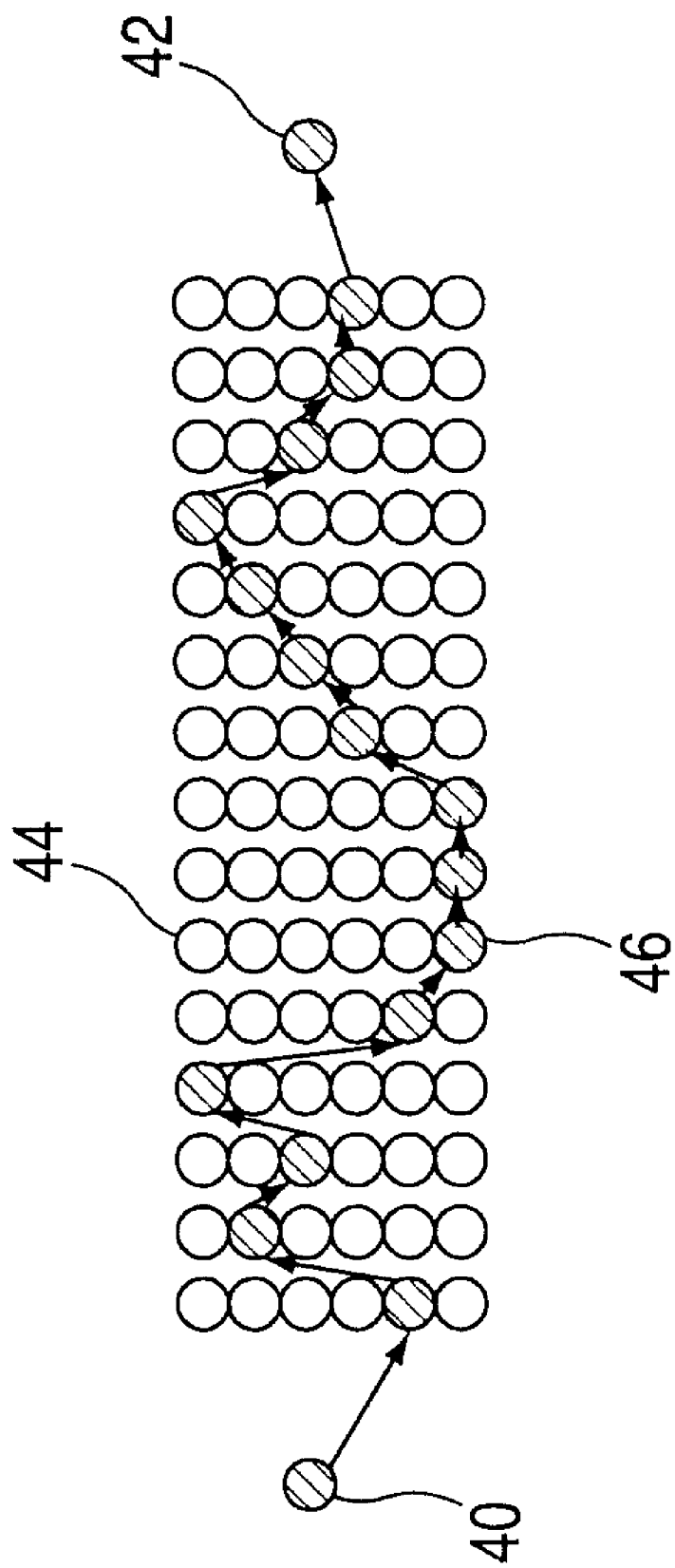
FIG. 3 illustrates one example of a graph including a path through the plurality of nodes that spans a path.

Referring to FIG. 3, one example of a graph including a path through the plurality of nodes that leads to the terminal node 42. The graph comprises an initial node 40, a plurality of nodes 44, a path 46, and a final node 42. In order for the grammar to accept a path 46, the path 46 needs to be found between the initial node 40 and the final node 42.

Figure 4:
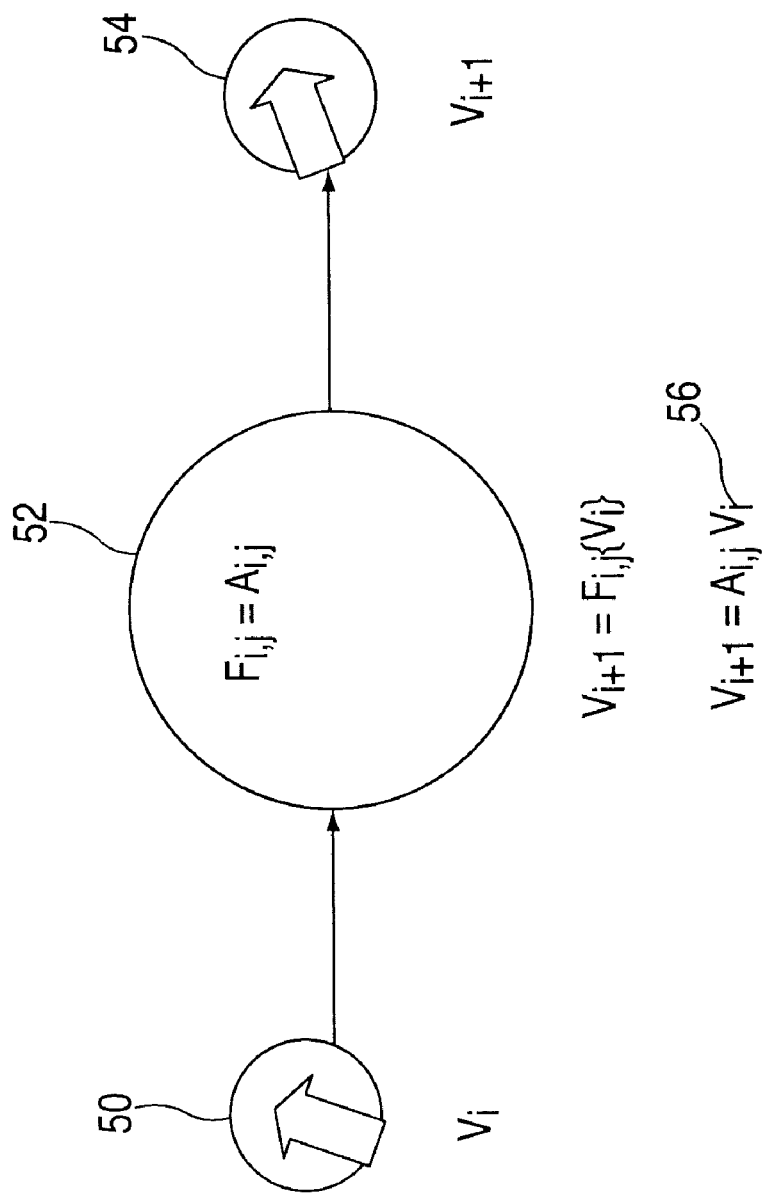
FIG. 4 illustrates one example of a function assigned to each node of the graph in FIG. 3.

Referring to FIG. 4, one example of a function assigned sequentially to each node of the graph in FIG. 3. FIG. 4 comprises a predecessor node 50, which is a node that precedes a certain node in a connected path, a central node 52 having an associated matrix operation, and a successor node 54, which follows the specific node in a connected path. Element 56 illustrates the matrix operations located in node 52. Therefore in order for user 40 of FIG. 3 to obtain information possessed by user 42, user 40 is required to apply every matrix operation located in every node of a path leading to user 42.

Figure 5:
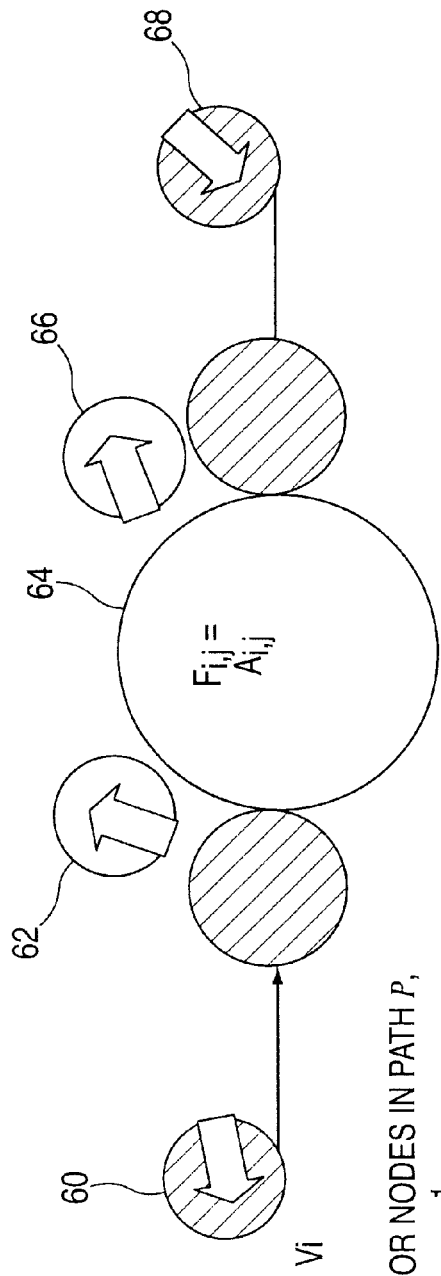
FIG. 5 illustrates one example of how the function assigned to a node occludes the kernel matrix A.

Referring to FIG. 5, one example of how the function assigned to a node occludes the kernel matrix K in the path is described. FIG. 5 comprises a predecessor node 60 in a path, a n occluding matrix 62, a node in the path 64 having a matrix operation, a subsequent node in the path 68, and a second occluding matrix 66.

Figure 6:
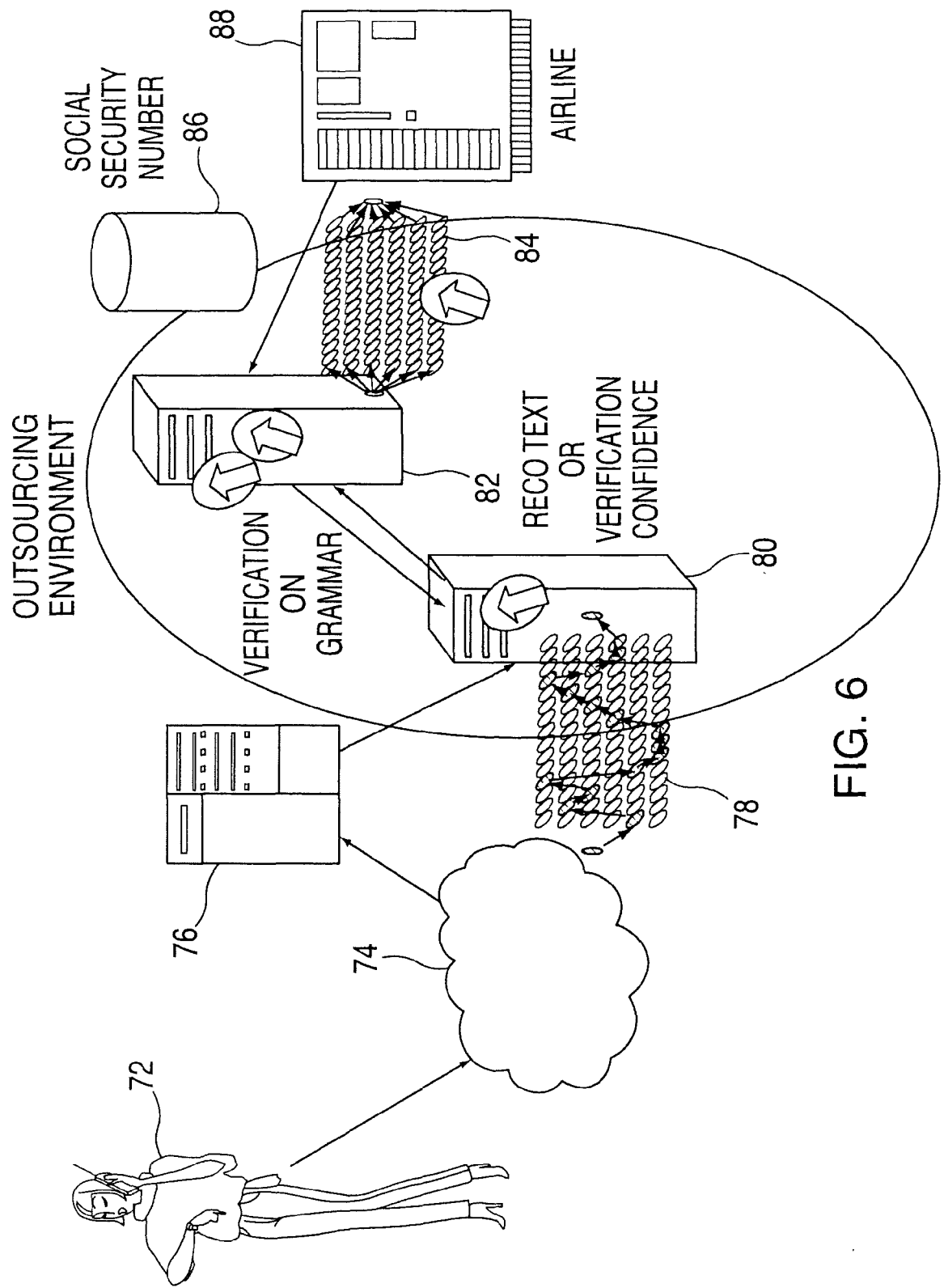
FIG. 6 illustrates one example of a secure system having speech application log files and databases due to occluded keyphrase verification.

Referring to FIG. 6, one example of a secure system having speech application log files and databases due to functions assigned to each of the nodes of the graphs is described. The secure system of FIG. 6 comprises a user 72, a network 74, a host system 76, a recognition or decoding grammar or graph 78, a recognition system 80, an application server 82, a social security database 86, and a mainframe 88. The operation of FIG. 6 is similar to the operation of FIG. 1 with the exception that in FIG. 6 the recognition system 80 is required to solve a sequence of matrix operations based on the path in the grammar 78 spanned by the user's 72 input in order to get any desired annotation related to a path in the grammar 78.

Figure 7:
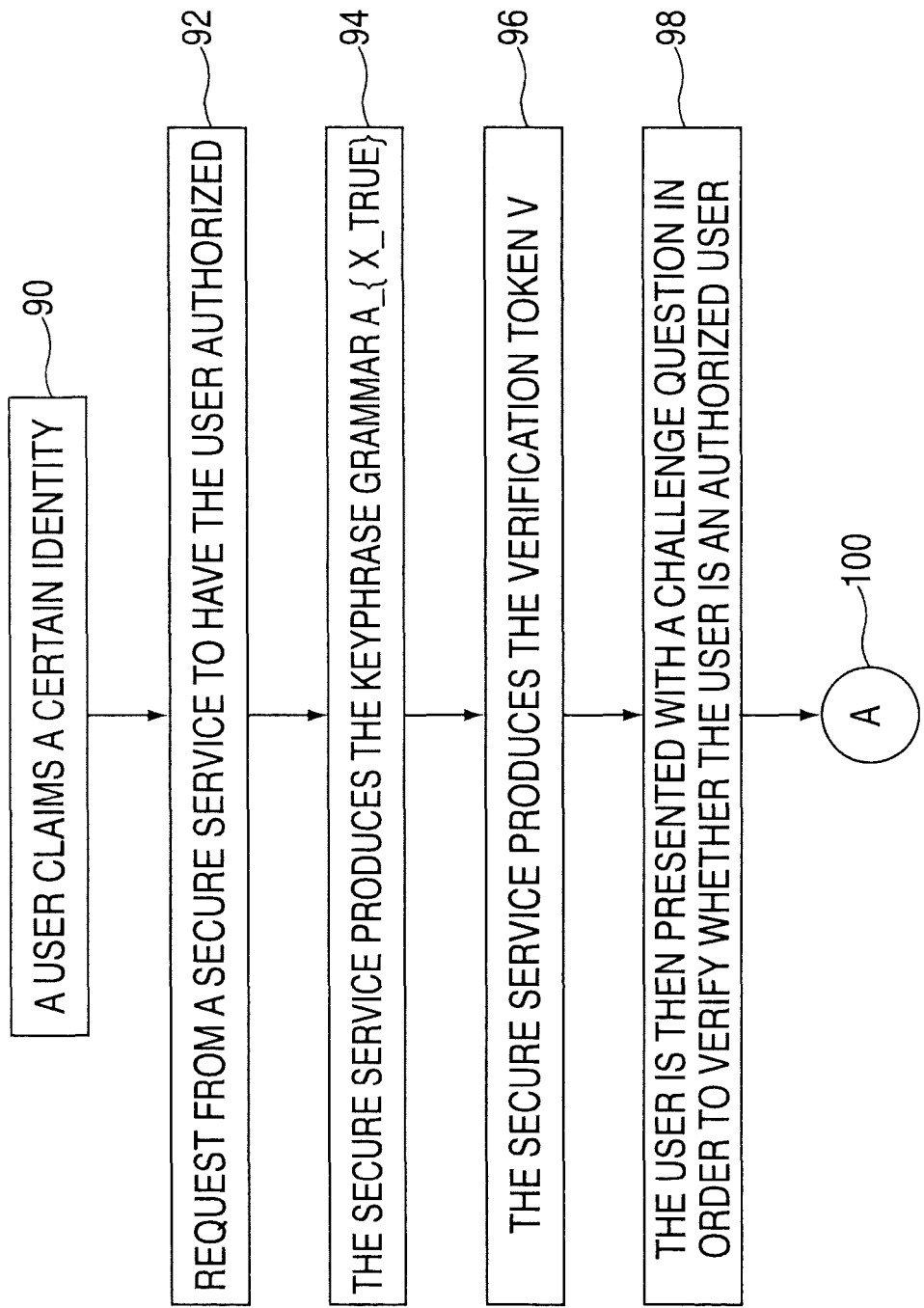
FIG. 7 illustrates one example of a flowchart illustrating an algorithm for verifying a keyphrase.
Figure 8:
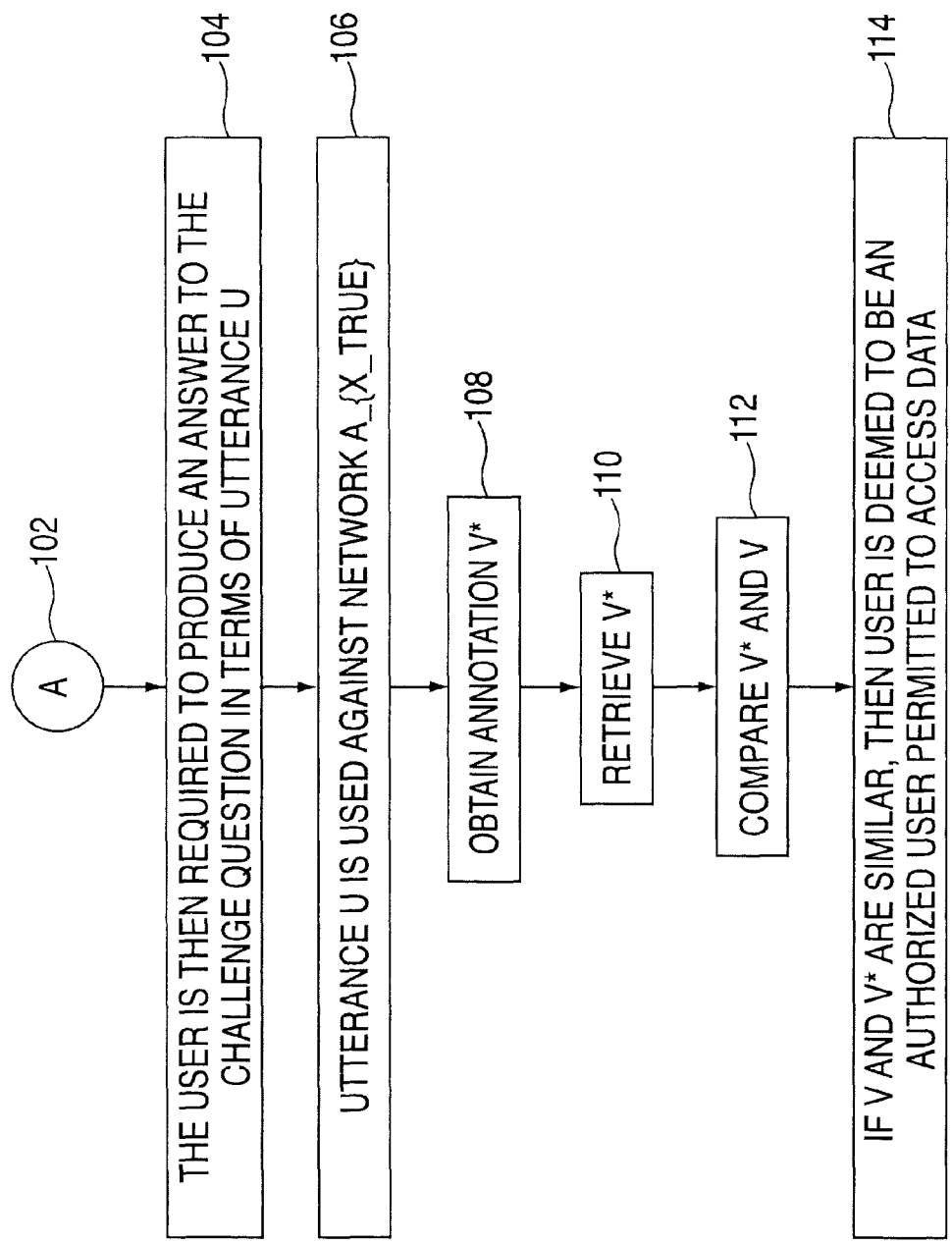
FIG. 8 illustrates one example of a flowchart illustrating an algorithm for verifying a keyphrase in accordance with FIG. 7.

Referring to FIGS. 7 and 8, the following algorithm provides a method for path concealment in networks and graphs. In particular:

Before an application or a document can be accessed, the application needs to determine if a user X has a password. Therefore, in step 90 an application determines that it needs to request a password from the user.

In step 92, the application requests from a secure service to have a keyphrase grammar generated for verification of the claimed identity of the user X, i.e., X_TRUE.

In step 94, the secure service produces the keyphrase grammar A_{X_true} and in step 96 the secure service produces the verification token V, the grammar A_{X_true} and the challenge question.

In step 98, the user is then presented with a challenge question 52 in order to verify whether the user X is an authorized user and not an intruder. Step 98 moves to steps 100 and 102 in order to connect FIGS. 7 and 8.

At step 104 of FIG. 8, user X is then required to produce an answer to the challenge question in terms of utterance U.

At step 106, utterance U is used against network A_{X_true} and at step 108 the resulting annotation V* is computed and is stored in a storage unit.

At step 110 annotation V* is retrieved.

At step 112, the application compares V* and V.

At step 114, if V and V* are similar enough, then user X is deemed to recognize or know the password. The user is deemed to be an authorized user permitted to access data in the application.

However, given a password, how can the secure service produce A_{X_true} and V so that password may not be inferred or reversed engineered easily by an intruder?

Another algorithm may be used to aid the above-mentioned algorithm. The algorithm below may be envisioned as a subroutine of the above-mentioned algorithm. When a first user locates a correct node on a graph connecting nodes in the spanned path, the node contains a matrix operation that is required to be solved to move on to the next node. The algorithm below generates A_{X_true} and matrix operations as follows and is described in FIGS. 9 and 10.

Figure 9:
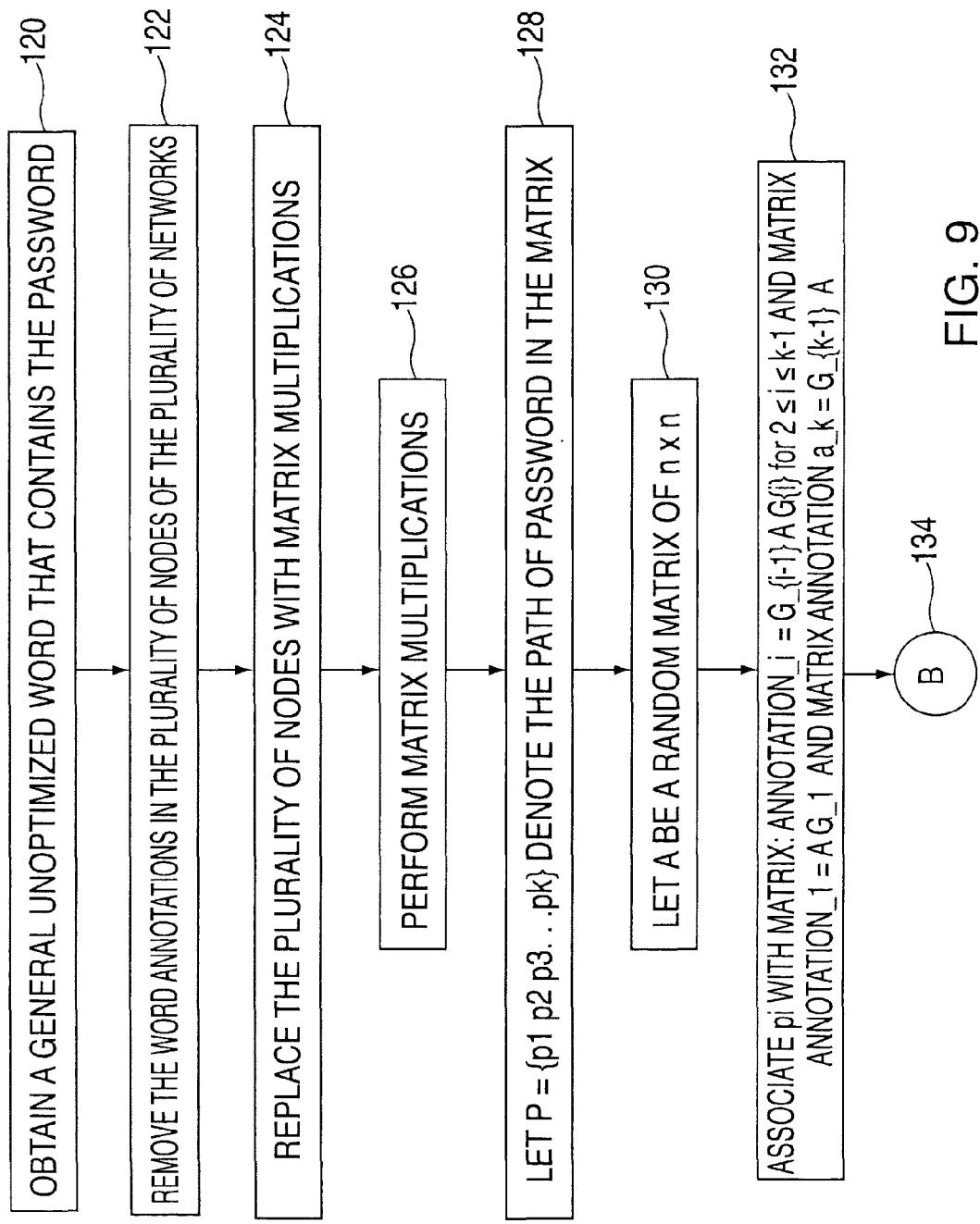
FIG. 9 illustrates one example of a flowchart illustrating the generation of the graph with matrix multiplications performed at each node for verifying a keyphrase.

At step 120 of FIG. 9, obtain a general unoptimized word (e.g., fixed length unigram) that contains the password.

At step 122, remove the word annotations in the plurality of nodes

At step 124, replace the node annotations in the plurality of nodes with matrix multiplications.

At step 126, perform matrix multiplications.

At step 128 let P={p1 p2 p3 . . . pk} denote the path of password in the matrix.

At step 130, let A be a random matrix of n×n.

At step 132, associate pi with matrix Annotation_i=G_{i−1} A G{i} for $2 \leq i \leq k-1$ and Annotation_1=A G_1 and Annotation a_k=G_{k−1} A. Step 132 moves to steps 134 and 136 in order to connect FIGS. 9 and 10.

Figure 10:
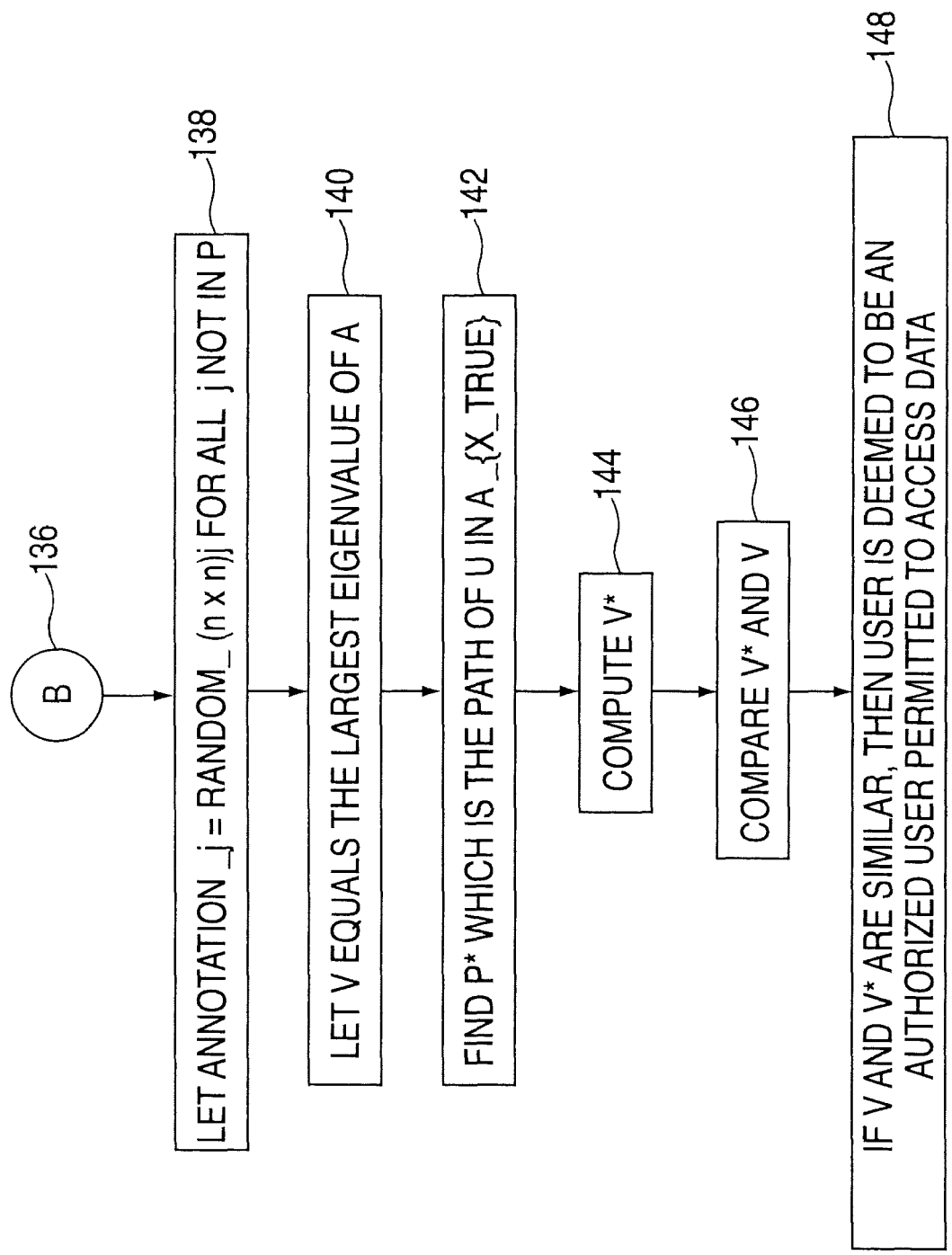
FIG. 10 illustrates one example of a flowchart illustrating the generation of the graph with matrix multiplications performed at each node for verifying a keyphrase in accordance with FIG. 9.

Referring to FIG. 10, at step 138 let Annotation_j=Random_(n×n)j for all j not in P and at step 140 let V equal the largest eigenvalue of A.

In addition, the algorithm to generate a random vector is:
Start with a random vector R.

At step 142, find P* which is the path of U in A_{X_true}.

At step 144, compute V* as follows: V*=(T_1*T_2*T_3 . . . *T_K)*R, as K→ large, then V* tends to become the largest eigenvalue of A.

At step 146 the application compares V* and V.

At step 148, if V and V* are similar enough, then user X is deemed to recognize or know the password. The user is deemed to be an authorized user permitted to access data in the plurality of networks.

As a result of the above algorithm analysis, a secure subsystem in an application could conceal the data itself by producing a secure annotation from an utterance. Furthermore, a robust method has been described for a verification system in which a secure subsystem in an application does not disclose a keyphrase to a non-secure subsystem in the application. The unsecure system does not allow reverse engineering of the graph to obtain a keyphrase. This is a solid foundation for keyphrase verification systems, particularly in environments in which privacy and security is a concern.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for data concealment between two parties in a system, the method comprising:
   upon the system soliciting one or more data from a user and generating a traversed path in a graph by using the one or more data provided by the user to generate the traversed path, the method including;
   performing a sequence of computations, each step in the sequence of computations being dictated by each connected node of a plurality of nodes of the traversed path in the graph;
   associating square matrices to each connected node of the plurality of nodes of the traversed path in the graph;
   initiating each of the sequence of computations with a random vector;
   performing matrix multiplications at each step in the sequence of computations;
   obtaining a result vector;
   using the result vector of a matrix and a vector product of each connected node of the plurality of nodes of the traversed path as a vector in a subsequent node in the traversed path;
   comparing an outcome of the sequence of computations to a value associated with the traversed path of a correct password by using cosine distances between vectors; and
   determining whether the user has determined the correct password based on the value associated with the traversed path of the correct password being less than a predetermined threshold value.

2. The method of claim 1, wherein the associated matrices have the form:
   $matrix\_i = G\_\{i-1\} \, A \, G\{i\}$ for $2 \leq i \leq k-1$;
   $matrix\_1 = A \, G\_1$; and
   $matrix\_k = G\_\{k-1\} \, A$;
   where G's are occluding matrices, A is a kernel matrix, i, j, k are index identifiers, (n×n) is the size of the matrix in the matrix multiplications, and matrix_1 and matrix_k are matrices associated with initial and terminal nodes in the graph, respectively.

3. The method of claim 1, wherein the system is divided into two subsystems, a security handling subsystem being a secure subsystem and an interaction subsystem being an insecure subsystem.

4. The method of claim 3, wherein the secure subsystem generates a symmetric kernel matrix with a dominant eigenvector.

5. The method of claim 3, wherein the secure subsystem retrieves the one or more data and assembles a general verification graph with matrices associated to the nodes.

6. A system for data concealment in a graph, the graph having a plurality of nodes, the system comprising:
   a communications network; and
   host system in communication with the network, the host system including software to implement a method comprising:
   upon a system soliciting one or more data from a user and generating a traversed path in a graph by using the one or more data provided by the user to generate the traversed path, the method including;
   performing a sequence of computations, each step in the sequence of computations being dictated by each connected node of the plurality of nodes of the traversed path in the graph;
   associating square matrices to each connected node of the plurality of nodes of the traversed path in the graph;
   initiating each of the sequence of computations with a random vector;
   performing matrix multiplications at each step in the sequence of computations;
   obtaining a result vector;
   using the result vector of a matrix and a vector product of each connected node of the plurality of nodes of the traversed path as a vector in a subsequent node in the traversed path;
   comparing an outcome of the sequence of computations to a value associated with the traversed path of a correct password by using cosine distances between vectors; and
   determining whether the user has determined the correct password based on the value associated with the traversed path of the correct password being less than a predetermined threshold value.

7. The system of claim 6, wherein the matrix multiplications include the following operations:
   $matrix\_i = G\_\{i-1\} \, A \, G\{i\}$ for $2 \leq i \leq k-1$;
   $matrix\_1 = A \, G\_1$; and
   $matrix\_k = G\_\{k-1\} \, A$;
   where G's are occluding matrices, A is a kernel matrix, i, j, k are index identifiers, (n×n) is the size of the matrix in the matrix multiplications, and matrix_1 and matrix_k are matrices associated with initial and terminal nodes in the graph, respectively.

8. The system of claim 6, wherein the system is divided into two subsystems, a security handling subsystem being a secure subsystem and an interaction subsystem being an insecure subsystem.

9. The system of claim 8, wherein the secure subsystem generates a symmetric random vector with a target eigenvalue distribution and obtains a dominant eigenvector.

10. The system of claim 9, wherein the secure subsystem retrieves the one or more data and assembles a general verification network.

11. A computer program product for path concealment in a graph via a keyphrase verification algorithm, the graph including a plurality of nodes, the computer program product comprising:
   a non-transitory storage medium readable by a processing circuit and storing instructions for execution by the processing circuit for performing a method comprising:
   upon a system soliciting one or more data from a user and generating a traversed path in a graph by using the one or more data provided by the user to generate the traversed path, the method including;
   performing a sequence of computations, each step in the sequence of computations being dictated by each connected node of the plurality of nodes of the traversed path in the graph;
   associating square matrices to each connected node of the plurality of nodes of the traversed path in the graph;
   initiating each of the sequence of computations with a random vector;
   performing matrix multiplications at each step in the sequence of computations;
   obtaining a result vector;
   using the result vector of a matrix and a vector product of each connected node of the plurality of nodes of the traversed path as a vector in a subsequent node in the traversed path;
   comparing an outcome of the sequence of computations to a value associated with the traversed path of a correct password by using cosine distances between vectors; and
   determining whether the user has determined the correct password based on a distance between the correct password being below a threshold.

12. The computer program product of claim 11, wherein the matrix multiplications include the following operations:
   compute Annotation_i=A G_{i-1} A G{i} for $2 \leq i \leq k-1$;
   compute Annotation_j=Random_(n×n)j;
   compute Annotation__1=A G__1; and
   compute Annotation a_k=G_{k-1} A;
   where G is grammar, A is annotation, i, j, k are natural identifiers, and (n×n) is the size of the matrix in the matrix multiplications.

13. The computer program product of claim 11, wherein the system is divided into two subsystems, a security handling subsystem being a secure subsystem and an interaction subsystem being an insecure subsystem.

14. The computer program product of claim 13, wherein the secure subsystem generates a symmetric random vector with a target eigenvalue distribution and obtains a dominant eigenvector.

15. The computer program product of claim 13, wherein the secure subsystem retrieves the one or more data and assembles a general verification network.

\* \* \* \* \*